Nov. 2, 1926.
H. W. BUNDY
1,605,326
SOLDERING APPARATUS
Filed June 18, 1925
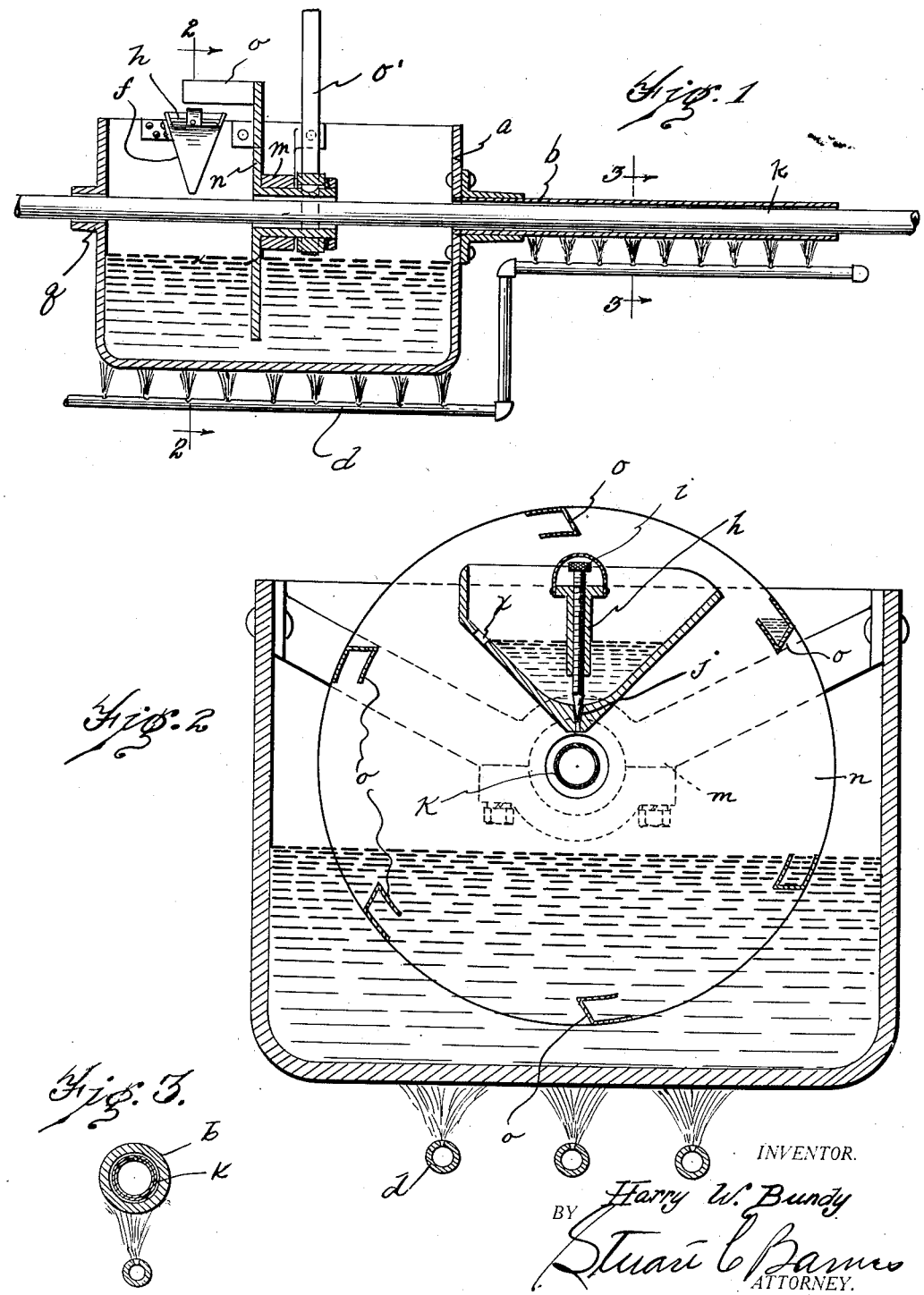

Patented Nov. 2, 1926.

1,605,326

UNITED STATES PATENT OFFICE.

HARRY W. BUNDY, OF DETROIT, MICHIGAN.

SOLDERING APPARATUS.

Application filed June 18, 1925. Serial No. 37,969.

This invention relates to a machine for applying solder to tubes, especially a machine for tinning lock seam or multi-ply tubing.

In my prior Patent No. 1,531,730, issued March 31, 1925, I have shown and described a machine for tinning tube. This machine will accomplish its purpose all right, but it causes a considerable waste of solder outside of the solder pot. This solder has to be recaptured and returned to the pot for reheating.

It is the object of the present invention to provide a method and apparatus for laying solder on the tube which will not permit any appreciable amount of the solder to escape from the pot.

In the drawings:

Fig. 1 is a vertical, longitudinal section of the machine.

Fig. 2 is a section taken on the line 2—2 of Fig. 1.

Fig. 3 is a section taken on the line 3—3 of Fig. 1.

$a$ designates the solder pot; $b$, a guide tube which is arranged to enter the upper part of the solder pot, above the level of the molten solder. The solder is kept melted with the gas burner $d$. $f$ is a funnel having overflow opening $x$ and supported above the path of the tube in the solder pot. It is provided with a cross web $h$ arranged to support the needle valve $i$ by which the flow out of the orifice $j$ may be regulated. $k$ designates the tube which may be lock seam or multi-ply tube or whatever character of tube it is desired to solder.

A bearing $m$ supports the bucket wheel $n$. This is provided with a plurality of buckets $o$ which can be of almost any formation, but here are shown as rhombic in cross section, with however, one side open. The wheel is revolved in any suitable way, as for instance by a belt $o'$.

When the wheel is revolved, the buckets dip into the molten solder, raise a quantity and then pour it into the funnel as they pass over the funnel, the solder then passes down through the regulated orifice in the funnel and on to the tube. Molten solder is very thin, being even more penetrating than water, consequently when poured on the tube it rapidly flows around the tube and drips off leaving a thin film on the tube. Any tendency of the solder to stick to the tube by capillary action is frustrated by the outlet guide $q$ of the pot so that when the tube passes out of the pot it is nicely coated with a film of tin or solder.

This apparatus and this method differs from that shown in my prior Patent No. 1,531,730 of 1925, in that the tube does not pass through the solder, but is supported above the top of the molten solder where the excess solder is free to drop off by gravity. In my prior patent, the excess solder had to be carried out of the pot and recaptured as it dropped from the pot and re-melted. In the present application, the excess solder simply drops back into the contents of the pot.

What I claim is:

1. An apparatus for solder-coating a tube, comprising a combination of a pot containing a body of molten solder, the pot having openings for the passage of the tube therethrough which are positioned above the level of the molten metal, means within the pot for raising quantities of the molten metal, means for pouring the raised metal over the tube and a guide device through which the tube is drawn as it leaves the pot.

2. An apparatus for solder-coating a tube, comprising a combination of a pot containing a body of molten solder, the pot having openings for the passage of the tube therethrough which are positioned above the level of the molten metal, means within the pot for raising quantities of the molten metal including a revolving bucket wheel, means for pouring the raised metal over the tube and a guide device through which the tube is drawn as it leaves the pot.

In testimony whereof I have affixed my signature.

HARRY W. BUNDY.